US005768524A

United States Patent [19]

Schmidt

[11] Patent Number: 5,768,524
[45] Date of Patent: Jun. 16, 1998

[54] METHOD FOR PROCESSING REQUESTS FOR NOTICE OF EVENTS

[75] Inventor: Michael Anthony Schmidt, Stone Ridge, N.Y.

[73] Assignee: International Business Machines Corporation, Armonk, N.Y.

[21] Appl. No.: 640,422

[22] Filed: Apr. 30, 1996

[51] Int. Cl.$^6$ .................................................. G06F 15/16
[52] U.S. Cl. ........................ 395/200.54; 395/200.59; 395/200.47; 395/674
[58] Field of Search ...................... 395/200.1, 200.02, 395/200.11, 200.09, 200.54, 200.5, 200.59, 200.47, 674

[56] References Cited

U.S. PATENT DOCUMENTS

| 5,341,477 | 8/1994 | Pitkin et al. | 395/200.1 |
| 5,355,484 | 10/1994 | Record et al. | 395/650 |
| 5,421,015 | 5/1995 | Khoyi et al. | 395/650 |
| 5,430,875 | 7/1995 | Ma | 395/650 |
| 5,566,337 | 10/1996 | Szymanski et al. | 395/733 |
| 5,592,664 | 1/1997 | Starkey | 395/600 |
| 5,621,892 | 4/1997 | Cook | 395/200.1 |

OTHER PUBLICATIONS

Yeast: a general purpose event–action system by Krishnamurthy et al., 1995 IEEE pp. 845–857, 1995.
Using events to buyild distributed applications by Bacon et al., 1995 IEEE publication, pp. 148–156, 1995.
Distributed Coordination model for client/server computing by Adler, 1995 IEEE publication, pp. 14–22, 1995.

Primary Examiner—William M. Treat
Assistant Examiner—Zarni Maung
Attorney, Agent, or Firm—Floyd A. Gonzalez; Heslin & Rothenberg

[57] ABSTRACT

A method of processing a request for notice of occurrence of an event in a distributed processing environment may in general terms comprise receiving a request for notice of occurrence of an event, the request including an identification of a resource in which the will occur, and identifying a monitor associated with an indicator of states of the resource. The method may further comprise obtaining indication of the event. The state characterizing the event may be received from the client or may be a default value. Indication of the event may be obtained by receiving state values and determining if they indicate the event, or periodically monitoring the indicator for occurrence of the event, or requesting monitoring from a monitor associated with the indicator.

14 Claims, 9 Drawing Sheets

METHOD FOR PROCESSING REQUESTS FOR NOTICE OF EVENTS

TECHNICAL FIELD

This invention relates, in general, to a distributed computing environment in a network of computers. In particular, the invention relates to processing requests for notice of events occurring in network resources.

CROSS REFERENCE TO RELATED APPLICATIONS

This application contains subject matter which is related to the subject matter of the following applications, which are assigned to the same assignee of this application and are filed on the same day as this application. Each of the below listed applications is hereby incorporated herein by reference:

"Processing Requests For States Of Resources," by Michael Schmidt, Ser. No. 08/640,306;

"Method For Serializing Actions Of Independent Process Groups," by P. R. Badovinatz et al., Ser. No. 08/640,220;

"Method For Barrier Synchronization In A Distributed Computing Environment," by P. R. Badovinatz et al., Ser. No. 08/640,218;

"An Application Programming Interface Unifying Multiple Mechanisms," by P. R. Badovinatz et al., Ser. No. 08/640,305, now abandoned;

"A Communications Method Involving Groups Of Processors Of A Distributed Computing Environment," by P. R. Badovinatz et al., Ser. No. 08/641,386;

"A Method For Group Leader Recovery In A Distributed Computing Environment," by P. R. Badovinatz et al., Ser. No. 08/640,219, now U.S. Pat. No. 5,704,032;

"A Method For Managing Membership Of A Group Of Processors In A Distributed Computing Environment," by P. R. Badovinatz et al., Ser. No. 08/640,412; and "Utilizing Batch Requests To Present Membership Changes To Process Groups," by P. R. Badovinatz et al., Ser. No. 08/641,445.

BACKGROUND ART

A computer network may be generally understood as a group of computers which are linked by a communication system. Computers generally comprise a processing unit, one or more memory devices such as random access memory (RAM) or disk storage, and an operating system for controlling the processor and memory devices. Each computer in a network may be referred to as a processing node, or simply as a node. In a network which supports a distributed processing environment, a task may be distributed across several nodes and processed in parallel.

Computer networks include various types of resources, and a given network may include several distinct resources of the same type. Network resources may comprise software or hardware. A resource state indicator may be provided in association with a network resource to indicate states of the resource.

It is often necessary for a client such as an application running on a node of a network to be informed of the occurrence of an event in a network resource, where the event is defined as the occurrence of a particular state of the resource. In general it is known that this can be accomplished by having the client directly request notice of the event from a monitor associated with a resource state indicator corresponding to the resource. The function of requesting notice of the event is generally referred to as event registration, and the monitor's function of detecting the event is generally referred to as event generation.

Prior art techniques for event registration require the client to provide a request for registration which includes the address to which the request for registration is to be routed. The client is provided with an address for registering events for each resource and presumes that each address will be valid at all times. If a resource relocates to another node, for example, upon the occurrence of a node failure, the client will be unable to continue to register for events occurring in that resource because it will no longer have a valid routing address for its requests.

SUMMARY OF THE INVENTION

The shortcomings of the prior art are overcome, and additional advantages are provided, through the present invention. In general, the present invention allows clients to register for events without the need to specify the destination of the request for registration. The invention allows a client to register for events by simply indicating the resource of interest and requesting notice of an event occurring in that resource. A distributed subsystem determines the monitor which corresponds to the resource of interest and may thereafter obtain indication of the event. The client can therefore reliably request event registration irrespective of whether the resource has changed location in the network.

Accordingly, the invention may be embodied in a method for processing a request for notice of occurrence of an event. A method embodiment of the invention may in general terms comprise receiving a request for notice of occurrence of an event, the request including an identifier of a resource for which event registration is desired, and identifying a monitor associated with an indicator of states of the resource. The method may further comprise obtaining indication of the event. The state characterizing the event may be received from the client or may be a default value. Indication of the event may be obtained by receiving state values and determining if they indicate the event, or periodically monitoring the indicator for occurrence of the event, or requesting notice of the event from a monitor associated with the indicator.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

The invention in general terms is embodied in a distributed subsystem which allows clients to register for events through a local subsystem daemon without the need to specify the destination of the request for registration. The invention allows the client to register for events by simply indicating the resource of interest and requesting notice of an event occurring in that resource. The distributed subsystem daemon determines the monitor which corresponds to the resource and may thereafter obtain indication of the event. The client can therefore reliably request event registration irrespective of whether the resource has changed location in the network.

Figure 1:
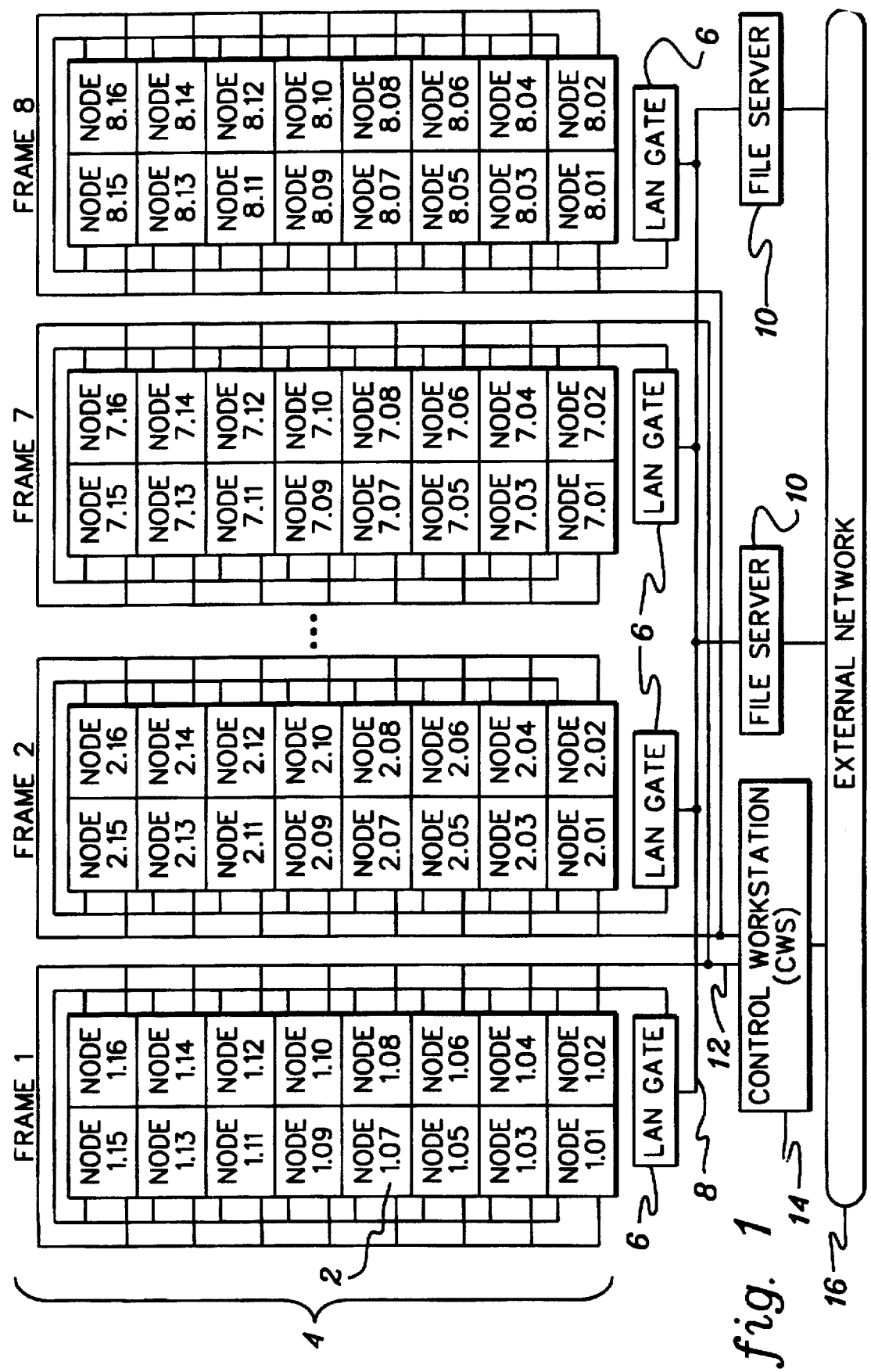
FIG. 1 depicts an exemplary network for supporting a distributed processing environment.

Reference is made to FIG. 1, which depicts an exemplary network for supporting a distributed processing environment. The network includes a plurality of nodes 2 which are grouped into frames 4 each containing sixteen nodes. Each frame is associated with a LAN gate 6 which controls communication over a communication path 8 between individual nodes of the frame and file servers 10. Each node is further associated through a communication path 12 with a control work station 14 which provides network monitoring functions and provides a link for communication with external networks 16. Each node may comprise a RISC/6000 computer running AIX, a UNIX based operating system provided by INTERNATIONAL BUSINESS MACHINES, INC. Each LAN gate may comprise a RISC/6000 computer, or a computer network connection to the LAN, or a network router. Those of ordinary skill in the art will recognize that many aspects of this exemplary network, such as the number of nodes, the type of communication paths, or the machines comprising the nodes and the LAN gates, may be modified while still maintaining the general function of supporting a distributed processing environment.

Figure 2:
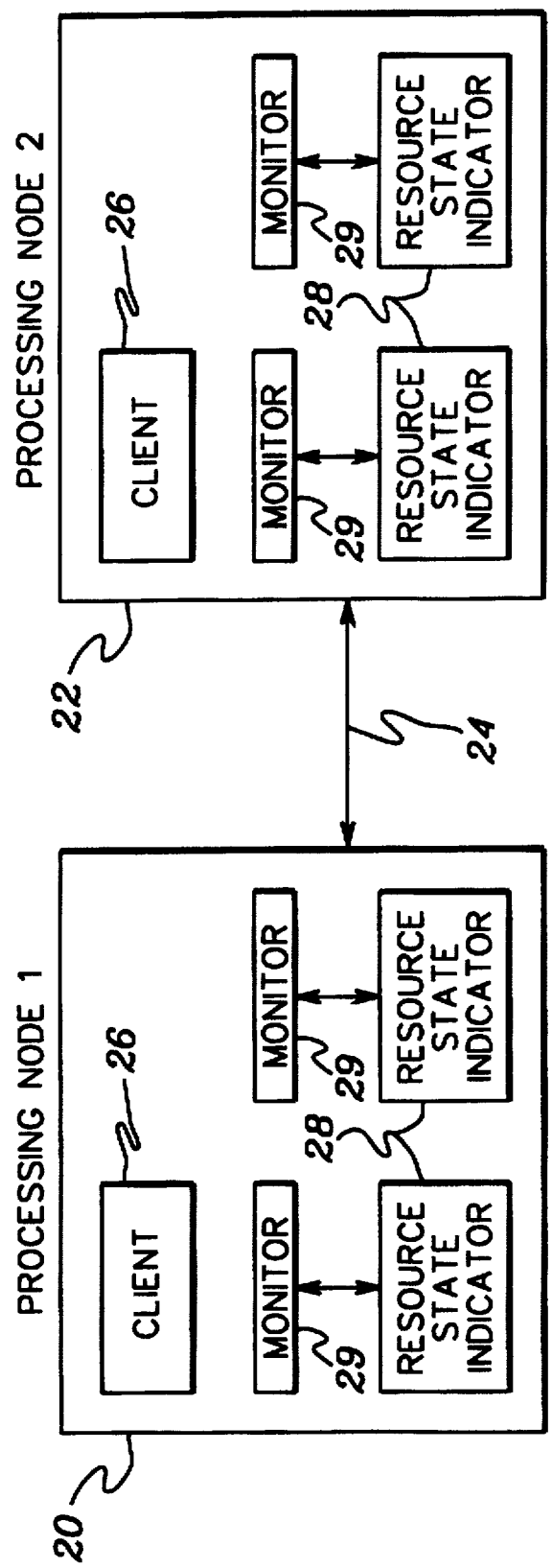
FIG. 2 depicts exemplary processes, resource state indicators, and monitors on processing nodes as known in the prior art.

One or more processes may be distributed over the nodes of a network such as that depicted in FIG. 1. FIG. 2 illustrates a typical prior art configuration of two exemplary nodes in an exemplary distributed processing environment. In this example, first and second processing nodes 20 and 22 are joined by a communication path 24. Each processing node supports a client process 26. Each processing node further supports one or more resource state indicators 28 which provide states of network resources. A resource state indicator may be an independent process running on the node, or it may be, for example, a component of a software subsystem which provides information about the subsystem. Network resources may be understood to be aspects of the network which are prespecified and which can be represented, for example, by a quantity, a percentage, a count, or a binary state. For example, the operational state of a network node may be defined as a resource, and may be represented as being either up (operational) or down (non-operational). Similarly, the amount of time which a software subsystem has spent on a particular process may be defined as a resource which may be expressed as a quantity representing the amount of time. Those of ordinary skill in the art will be aware of the many additional types of network resources which exist in a distributed processing environment. A number of resource state indicators may be provided by the AIX operating system discussed above.

Referring still to FIG. 2, a monitor 29 is associated with each resource state indicator 28. The monitor 29 receives data from the resource state indicator 28 and is capable of determining the occurrence of an event. To continue with the previous examples, an event in a resource defined as the operational state of a node could be the occurrence of the down state of the node, i.e. node failure. Similarly, for a resource defined as the amount of time which a software subsystem has spent on a particular process, an event could be the amount of time spent exceeding one second. An event could also be defined as a particular type of change in states of a resource, for example, the difference in amount of memory in use at two different instances.

To register for an event, prior art techniques require a client such as the client 26 of the first processing node 20 to directly access the particular monitor corresponding to the resource state indicator associated with the resource for which the client wishes to register for an event. This requires the client to provide routing information in order to properly provide its request for registration to the appropriate monitor. If a resource state indicator and monitor corresponding to a particular resource have relocated, for example due to a node failure, the client will no longer be able to register for events occurring in that resource because its routing information will no longer be valid. Prior art techniques further require that the event is predefined, i.e. the client cannot specify the state or other occurrence which characterizes the event.

Figure 3:
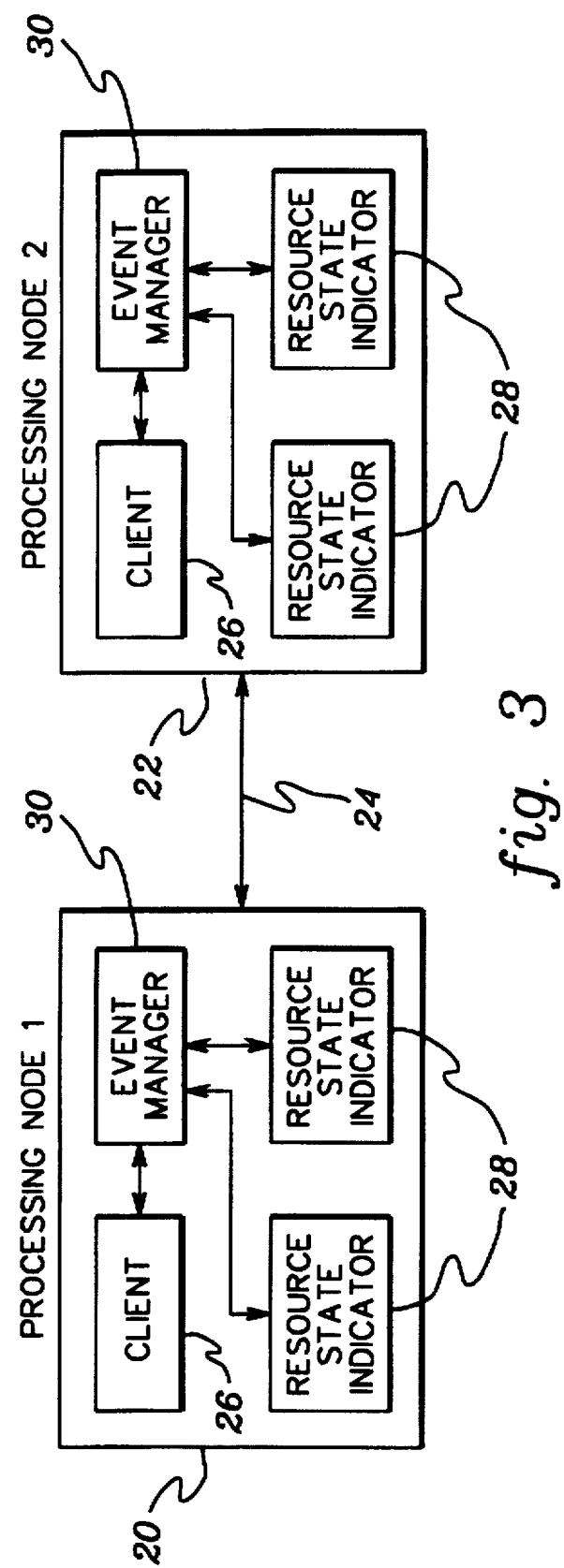
FIG. 3 depicts exemplary processes and resource state indicators on processing nodes in conjunction with an event management subsystem embodying the invention.

Reference is now made to FIG. 3, which shows an exemplary embodiment of the invention in which an event management daemon 30 is provided at each node of the exemplary network. The event management daemon 30 is capable of communicating with clients 26 and resource indicators 28 located on its processing node, as well as with its peer event management daemons 30 located on other nodes of the network. The event management daemon 30 is further capable of acting as a monitor of resource state indicators 28 which are local to its node. The event management daemon 30 further functions to receive requests for event registration from clients. These requests need only identify the resource of interest. Having received an identifier of a particular resource, the event management daemon then functions to obtain indication of occurrence of the event. If the event management daemon determines that the resource state indicator corresponding to the resource of interest is located on its own node, the event management daemon directly monitors data provided by the resource state indicator for occurrence of the event. If the event management daemon determines that the resource state indicator corresponding to the resource of interest is located on another node, the event management daemon requests monitoring of the resource from its peer event management daemon on that other node. The invention thus eliminates the need for the client to identify the destination of a request for event registration. The event management daemon is further capable of monitoring an event which is specified by the client.

Figure 4:
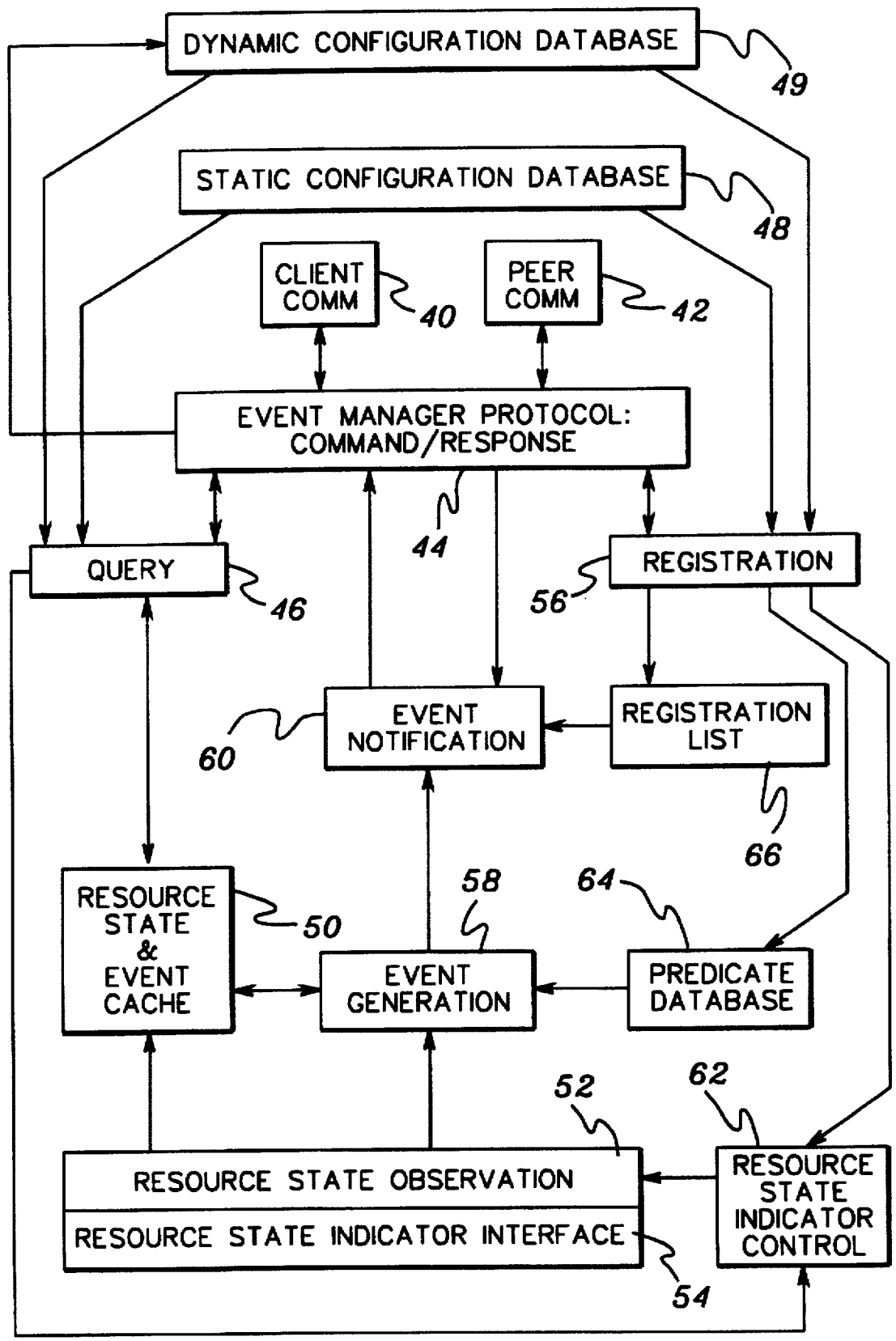
FIG. 4 depicts an exemplary configuration of functional components of an embodiment of the invention.

Reference is now made to FIG. 4, which depicts an exemplary event management daemon in accordance with the invention. The components of the exemplary event management daemon may be provided, for example, as a computer program product stored in memory at a node of a network for causing the node to operate in accordance with the methods and functions discussed below.

The event management daemon is provided with a client communication module 40 which may employ, for example, UNIX domain sockets for communicating with clients. The event management daemon is further provided with a peer communication module 42 for communicating with peer event management daemons on other nodes. Peer communication may be provided over communication paths as exemplified in FIG. 1. It is desirable to provide highly reliable communication between peers by reliably routing messages between peers over known active communication paths. This may be facilitated through the use of functions as described in the copending application entitled "Method for Serializing Actions of Independent Processor Groups," as described and incorporated by reference above.

The event management daemon is further provided with a command/response module 44 which communicates with the client communication module 40 and the peer communication module 42. The command/response module 44 is provided with logic for receiving and routing incoming communications, such as requests for event registration, and for sending commands and responses such as requests for event registration and notice of occurrence of events.

The event management daemon is further provided with a registration module 56 which may communicate with the command/response module 44 and with a configuration database 48. The registration module may be provided with logic for registering and unregistering for events. The registration module may further be provided with logic for terminating registration in response to a termination command, which may typically be received when a client process is determined to no longer exist.

The registration module 56 may further be provided with logic for determining the event management daemon for monitoring a particular resource, and logic for sending requests for registration of non-local events to the proper peer event management daemon. These functions may be enabled through reference to information stored in a static configuration database 48. The static configuration database 48 may include definitions of resource types, definitions of resources, and definitions of default events for resources. The static configuration database may also include information indicating whether an identifier of a resource is indicative of the event management daemon which is responsible for monitoring that particular resource. Resource types and resources defined in the static configuration database are considered to be prespecified.

The functions of the registration module may further be enabled through reference to a dynamic configuration database 49. The dynamic configuration database 49 may include information correlating event management daemons with resources for which the event management daemons are not indicated by the identifier of the resource. Such resources may comprise, for example, resources which may change location within the network.

The information stored in the dynamic configuration database 49 may be provided by event management daemons which are associated with indicators of states of resources for which monitors cannot be determined from the static configuration database 48. It is preferable that the dynamic configuration database 49 is maintained at the control work station of the network, as illustrated in FIG. 1, and referenced by other event management daemons using their peer communication modules. Consequently, the dynamic configuration database 49 illustrated in FIG. 4 need not be provided for every event management daemon, as long as it exists at one event management daemon in the system.

The event management daemon may further be provided with a registration list 66 which may receive data from the registration module 56. The registration list may maintain lists of event registrations, where each registration comprises a resource type and a state of that resource which characterizes the event. The state which characterizes an event may also be referred to as a predicate, and may be stated as an absolute value, or as a threshold value, or as the occurrence of a specified change in state. The registration list 66 may further include information identifying the requester of each event registration.

The event management daemon may further be provided with a predicate database 64 which may receive data from the registration module 56. The predicate database may contain the states which characterize events occurring in resources having resource state indicators which are local to the event management daemon.

The event management daemon may further be provided with a resource state observation module 52. This module may observe state information provided by resource state indicators through a resource state indicator interface 54. The interface provided for indicators may comprise shared memory, for example shared memory as is provided by the Performance Toolbox For AIX product available from IBM. The resource state observation module 52 may observe state data and forward it to an event generation module 58 and a resource state and event cache 50 periodically at a rate which may be configured. However, it has been found preferable to observe the states of those resources which are represented by binary states, i.e. up or down, at every instance at which the state of the resource changes. Consequently, for such resources it is preferable to provide a communication path from state indicators of such resources to the resource state observation module 52 such that each instance of change of the state is observed and forwarded to the event generation module 58 and the resource state and event cache 50. The operation of the resource state observation module may be initiated by a resource state indicator control module 62 which receives instruction from the registration module 56.

The event generation module 58 of the event management daemon may be provided with logic for determining the occurrence of events. The event generation module 58 may receive current states from the resource state indicator 54 and from the resource state and event cache 50, and may receive information regarding predicates which characterize events for particular resources from the predicate database 64. The event generation module may thus be provided with logic for comparing resource states and predicates to determine the occurrence of events. The event generation module 58 may be provided with logic such that its operation is invoked upon the queuing of state data from the resource state observation module 52. The event generation module may provide notice of events to an event notification module 60.

The event notification module 60 may be provided with logic to perform the functions of receiving notice of occurrence of events and directing notice of events to the requester of notice. The event notification module 60 may receive notice of occurrence of events from the event generation module 58 or from other event management daemons located on other nodes of the network. The latter type of notice may be received in the event management daemon through the peer communication module 42 and provided to the event notification module 60 through the command/response module 44. The event notification module 60 may determine the identity of the requester of notice of the event from information provided by the registration list 66. In the event that the requester is local to the node of the event management daemon, indication of the event may be provided to the requester through the client communication module 40. In the event that the requester is not local to the node of the event management daemon, indication of the event may be provided to the event management daemon which is local to the requester through the peer communication module 42. The event notification module 60 may further be provided with logic for bundling indications of multiple of events which are to be provided to a single requester.

It will be noted that the exemplary event management daemon of FIG. 4 includes a query module 46. This module is used for providing the related event management function providing states of resources, which is the subject of the copending application entitled "Processing Requests for States of Resources" and incorporated herein by reference. While it is preferable to provide this additional module in an event management daemon, its function is not necessary to enable the operation of the invention which is the subject of the present application or to disclose its best mode.

The exemplary event management daemon of FIG. 4 thus serves as a system which comprises an embodiment of the invention. The exemplary event management daemon of FIG. 4 similarly serves to perform methods which comprise an embodiment of the invention. Methods embodying the invention may be further understood by reference to FIG. 5–FIG. 7.

Figure 5:
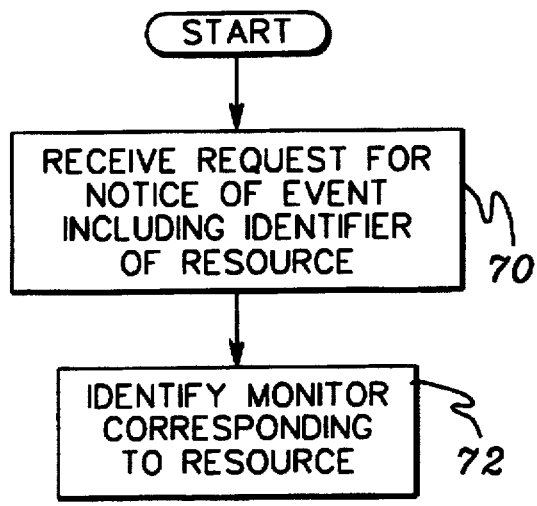
FIG. 5 depicts a method for processing a request for notice of occurrence of an event in accordance with the invention.

Reference is now made to FIG. 5, which depicts a method for processing a request for notice of an event. In this method, a request for notice of an event is received [70] from a client. The request includes an identifier of the resource in which the event will occur. In the embodiment of FIG. 4, the request may be received through the client communication module 40 if it originates locally to the event management daemon, or it may be received through the peer communication module 42 from another event management daemon if it does not originate locally. In either case, the request may then be provided by the command/response module 44 to the registration module 56. The registration module 56 may in turn determine whether the resource of the event is local, and if so, store the request in the registration list 66.

The identifier received [70] in the method of FIG. 5 may comprise, for example, a unique character string. As an illustration, an identifier of the resource defined as the operational state of node 1 of a network could be "NODE1".

Figure 5B:
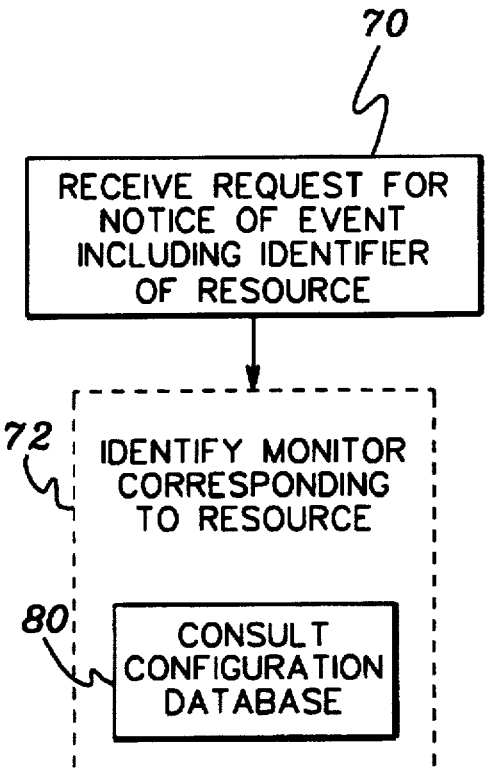
FIG. 5b depicts details of an embodiment of the method of FIG. 5.
Figure 5A:
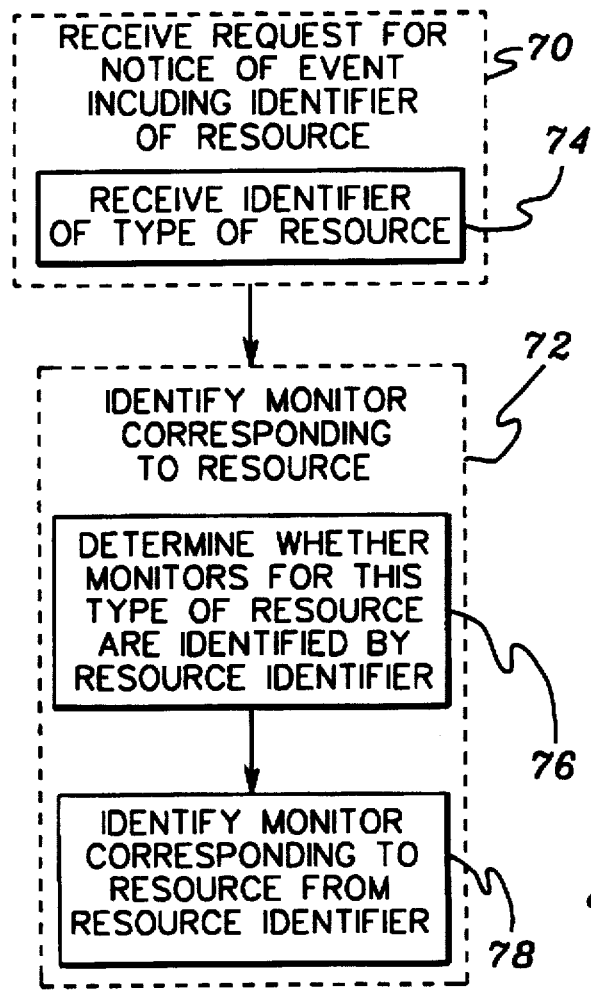
FIG. 5a depicts details of an embodiment of the method of FIG. 5.

Alternatively, as depicted in FIG. 5a, receiving [70] the identifier may include receiving [74] an identifier of the type of the resource such that the full identifier comprises an identifier of the resource type and an identifier of the particular resource of that type which is of interest. As an illustration, a prespecified resource of the network may be defined as the percentage of total free space of a logical volume. The resource type may therefore be named LogVol.%totfree. Specific resources of this type may be defined in the resource definition as being specified by the elements of a node number, a volume group, and a logical volume. An identifier of a particular resource of the type LogVol.%totfree may therefore take the form (NodeNum=__, VG=__, LV=__). Such an identifier may be referred to as an instance vector. When using an instance vector in combination with a resource type to identify a resource, it is preferred whenever possible that the instance vector include the number of the node from which the resource may always be monitored, for reasons which will be explained below.

The use of an instance vector allows grouping of requests, e.g. specifying a single resource type and several resources of that type, and wildcarding, e.g. specifying a single resource type and all resources of that type fitting a given criterion. By providing a wildcard symbol for one of the elements of the instance vector, a number of resources of that type may be specified using a single instance vector. All resources of a resource type may similarly be identified simultaneously by providing a single wildcard symbol.

Returning to FIG. 5, the method illustrated in FIG. 5 comprises the further step of identifying [72] a monitor associated with the resource state indicator which provides state data for the resource in which the event will occur. As shown in FIG. 3, the monitor may comprise an event management daemon. Referring to FIG. 5a, identifying the monitor may comprise determining [76] that the monitor is identified by the resource identifier. As an example, the LogVol.%totfree resource type will be used. It may be true that for this type of resource, the elements of the instance vector (NodeNum=__, VG=__, LV=__) provide sufficient information to identify the monitor associated with the resource because the resource will always be located on a particular node, and therefore the NodeNum element of the instance vector will reliably identify both the node of the resource and the node its monitor. In the embodiment of FIG. 4, determination of whether the instance vector identifies monitors for a particular type of resource may be made by logic provided to the registration module 56, through reference to information specifying whether this condition is true for that particular type of resource. Such information could be provided, for example, in the static configuration database 48. If it is determined that monitors for the identified type of resource are identified by the resource identifiers, the monitor may then be determined [78], for example, from the NodeNum element of the instance vector. In the embodiment of FIG. 4, this may be performed by logic provided in the registration module 56.

Alternatively, as illustrated in FIG. 5b, identifying [72] a monitor associated with the resource state indicator corresponding to the resource which the client has specified by its identifier may be accomplished by consulting [80] a configuration database which correlates monitors with resources. This would be done if it was determined that the resource was not of the type for which the instance vector indicates a monitor. In the embodiment of FIG. 4, this may be performed by the registration module 56 using information provided by the dynamic configuration database 48.

Figure 5C:
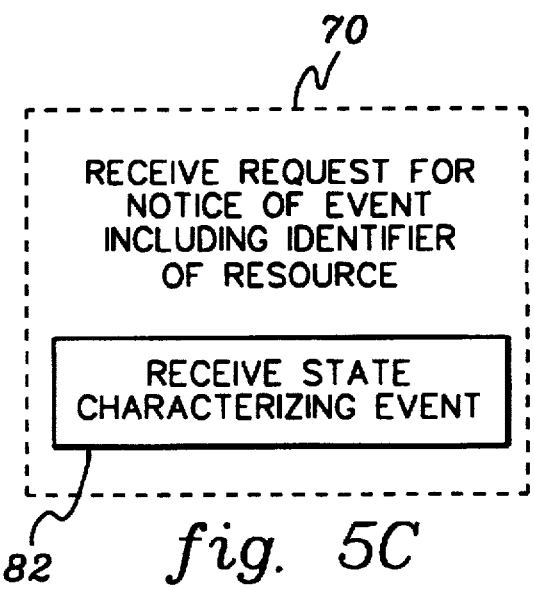
FIG. 5c depicts details of an embodiment of the method of FIG. 5.

Referring now to FIG. 5c, receiving [70] a request for notice of an event may include receiving [82] a state characterizing the event. In the embodiment of FIG. 4, the received state would be provided by the registration module 56 to the registration list 66 and to the predicate database 64.

Figure 6:
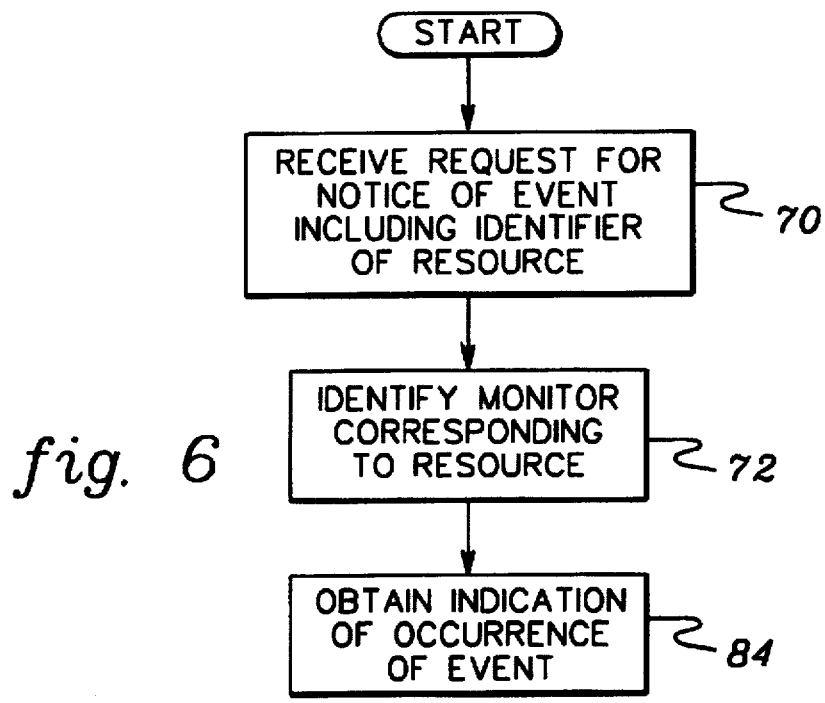
FIG. 6 depicts a further method for processing a request for notice of occurrence of an event in accordance with the invention.
Figure 6A:
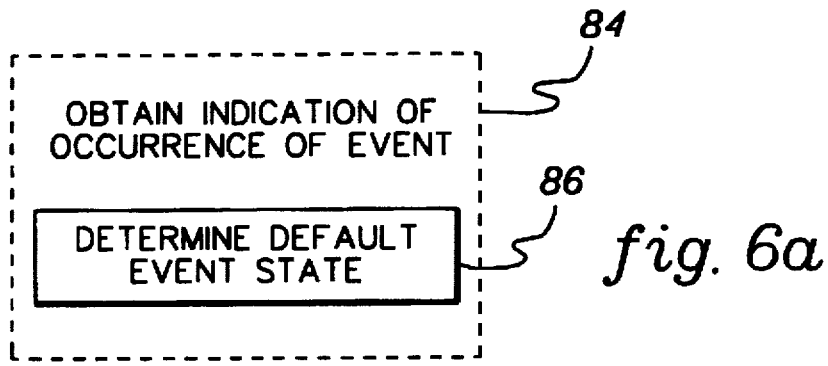
FIG. 6a depicts details of an embodiment of the method of FIG. 6.

Referring now to FIG. 6, the processing method as illustrated in FIG. 5 may further comprise obtaining [84] indication of occurrence of the event. Referring to FIG. 6a, this may include, in cases where an event state has not been specified, determining [86] a default event state for the resource. In the embodiment of FIG. 4, this may be performed by the registration module, which may determine the default state from information provided by the configuration database 48. The default event state may then be forwarded to the registration list 66 and to the predicate database 64.

Figure 6B:
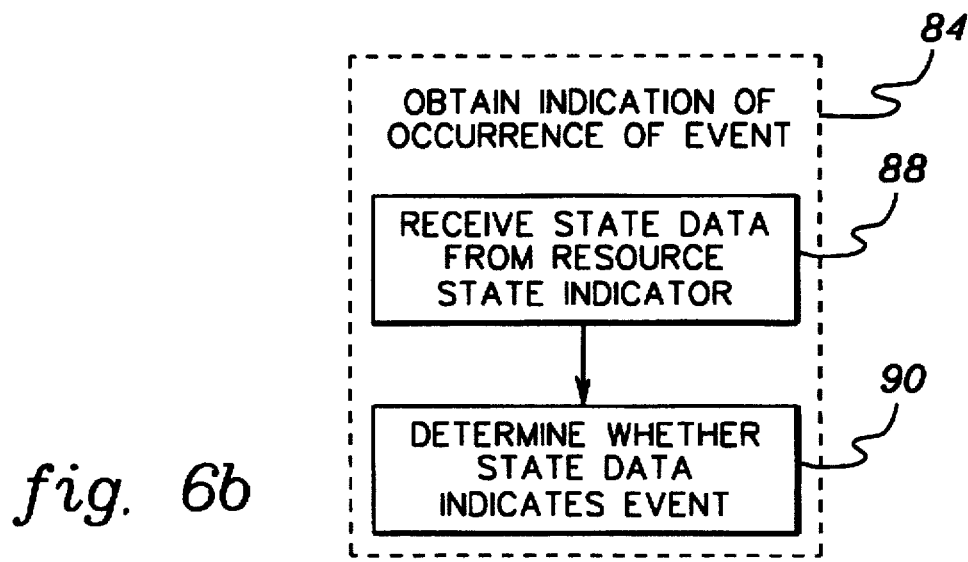
FIG. 6b depicts details of an embodiment of the method of FIG. 6.

Referring now to FIG. 6b, obtaining [84] indication of occurrence of the event may comprise receiving [88] state data provided by a resource state indicator and determining [90] whether the state data indicates occurrence of the event. This would be done if it has been determined that the event management daemon receiving the request is also the event management daemon responsible for monitoring the resource of interest. In the embodiment of FIG. 4, state data may be received by the resource state observation module 52 through the resource state indicator interface 54. Data would be considered to be received when it has been provided over a communication path, as preferred in the case of resources having binary states as discussed above. Received data may be provided by the resource state observation module 52 to the event generation module 58 which may determine whether an event is indicated using predicate data supplied by the predicate database 64.

Figure 6C:
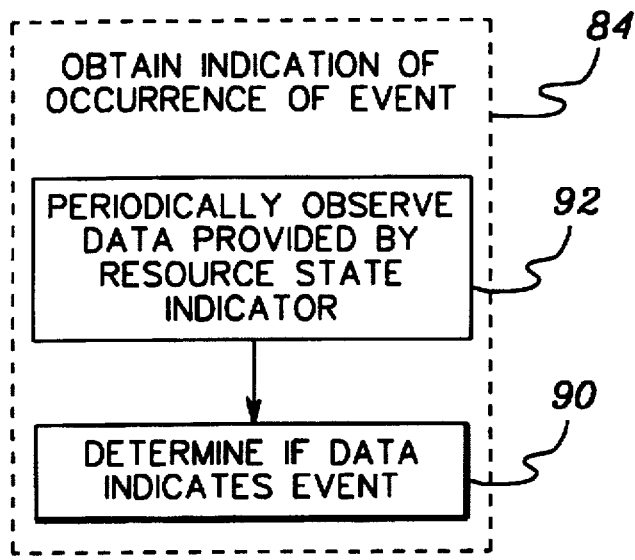
FIG. 6c depicts details of an embodiment of the method of FIG. 6.
Figure 6D:
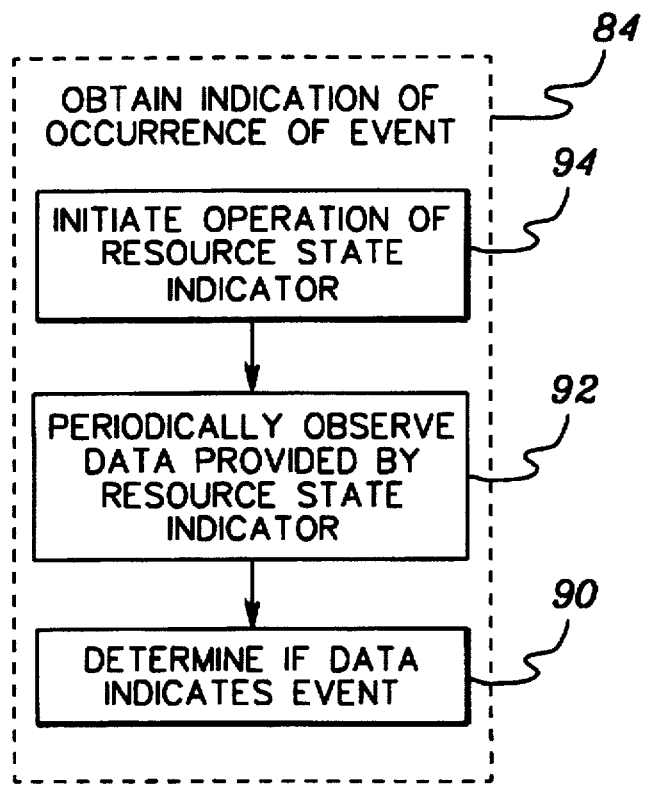
FIG. 6d depicts details of an embodiment of the method of FIG. 6.

Referring now to FIG. 6c, obtaining [84] occurrence of the event may alternatively comprise periodically observing [92] data provided by a resource state indicator and determining [90] if the data indicates occurrence of the event. This would be done if it has been determined that the event management daemon receiving the request is also the event management daemon responsible for monitoring the resource of interest. In the embodiment of FIG. 4, data may be periodically provided by the resource state observation module 52, such that the event generation module 58 will periodically determine whether an event has occurred. The event generation module may also observe data stored in the resource state and event cache 50 if, for example, the registered event is characterized by a difference between a current state and the prior observed state. In some instances it will be determined that no state information will be available for observation because operation of the resource state indicator has not been initiated. In such instances, as illustrated in FIG. 6d, it may be necessary to initiate [94] the operation of the resource state indicator. In the embodiment of FIG. 4, this may be accomplished by the resource state indicator control 62, at the command of the registration module 56.

Figure 6E:
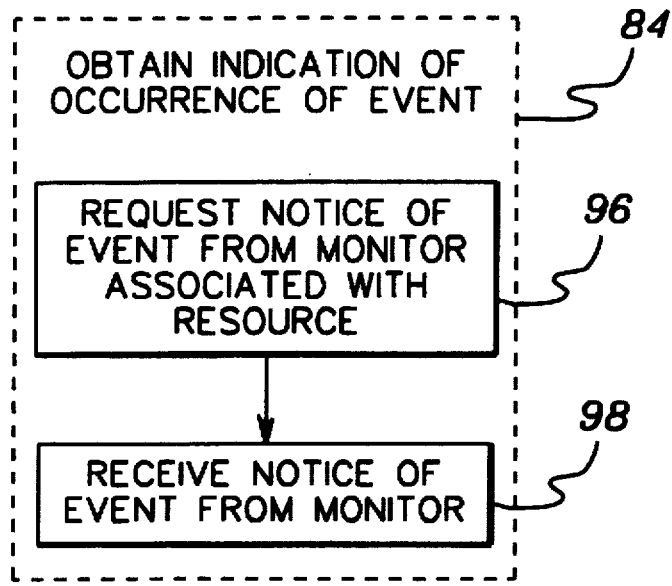
FIG. 6e depicts details of an embodiment of the method of FIG. 6.
Figure 6F:
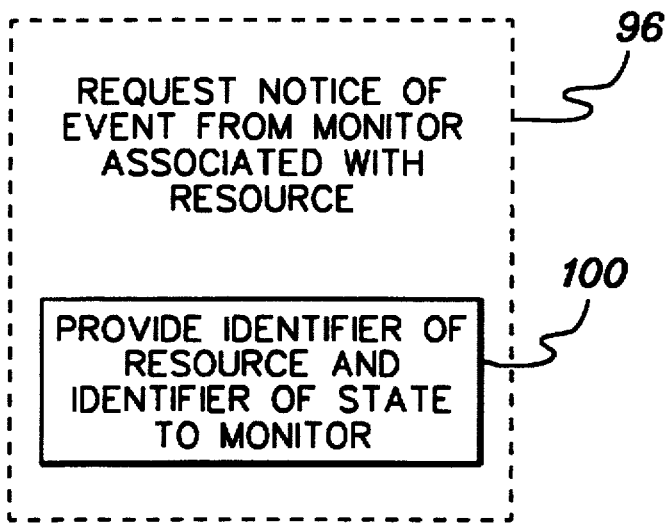
FIG. 6f depicts details of an embodiment of the method of FIG. 6.

Referring now to FIG. 6e, when the resource state indicator associated with the resource of interest is not local to the node at which initially received the request for notice of the event, obtaining indication of occurrence of the event comprises requesting [96] notice of occurrence of the event from the monitor associated with the resource state indicator corresponding to the resource, and receiving [98] notice of occurrence of the event. Referring to FIG. 6f, requesting [96] notice may include providing [100] an identifier of the resource of interest and event state to the monitor. As shown in FIG. 3, the monitor from which notice is requested may be a peer event management daemon located on the node of the resource. In the embodiment of FIG. 4, the registration module 56 may request notice of the event from the proper peer event management daemon using the command/response module 44 and peer communication module 42. The recipient event management daemon preferably will be of the type illustrated in FIG. 4 and will function in the manner of that embodiment as discussed herein. Thus the remote event management daemon will receive and process the request in the manner described above for processing a request for notice of an event which may be monitored locally. Notice of the event will then be returned over the communication path to the local event management daemon through the peer communication module 42.

Figure 7:
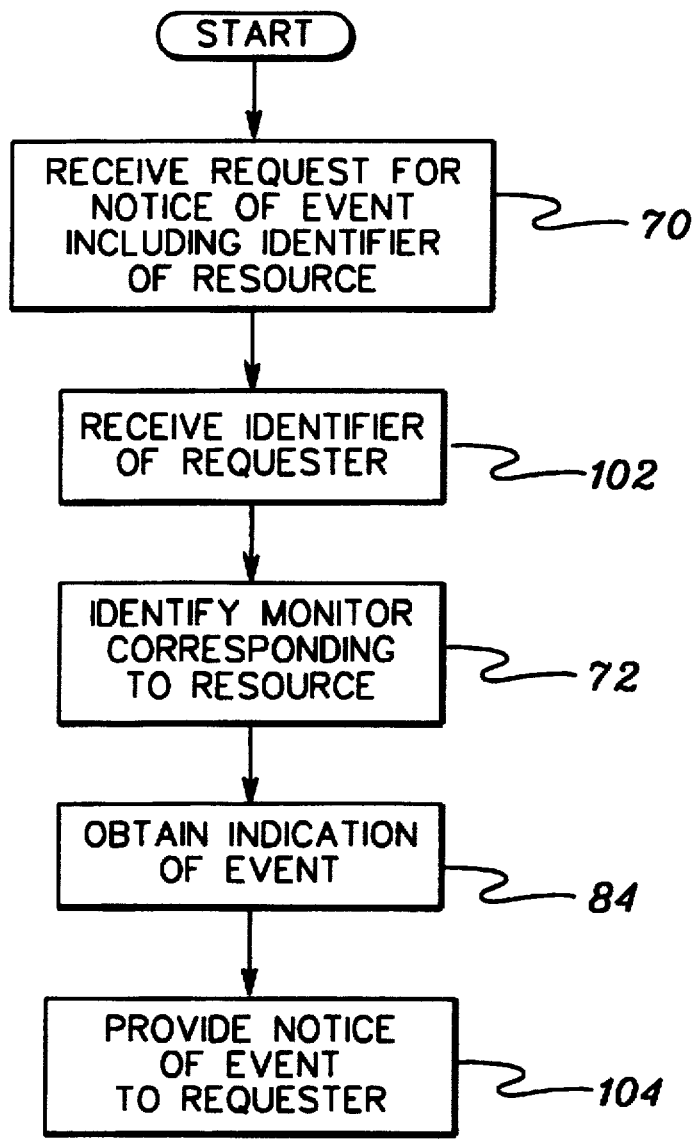
FIG. 7 depicts a further method for processing a request for notice of occurrence of an event in accordance with the invention.

Referring now to FIG. 7, the processing method as illustrated in FIG. 6 may further comprise receiving [102] an identifier of the requester of notice of the event and indicating [104] the event to the requester. In the embodiment of FIG. 4, the identifier of the requester may be received through the client communication module 40, and the indication of the event may be returned to the requester through the client communication module 40.

Accordingly, the invention may be embodied in a method of processing a request for notice of an event where the method comprises receiving a request for notice of an event, the request including an identifier of the resource of interest, and identifying the monitor associated with the resource state indicator corresponding to the resource. The method may further include obtaining notice of occurrence of the event. Referring to the embodiment of FIG. 4, the modules illustrated therein, when implemented for example in the form of a programmed processing node in a network, may provide a system embodying the invention, such modules acting in concert to provide means for receiving a request for notice of an event, the request including an identifier of the resource of interest, and means for identifying the monitor associated with the resource state indicator corresponding to the resource. Similarly, a computer program product which implements such a system on a processing node of a network may embody the invention where that computer program product comprises computer program product means for receiving a request for notice of an event, the request including an identifier of the resource of interest, and computer program product means for identifying the monitor associated with the resource state indicator corresponding to the resource.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. In a network of computers, a method for processing a request for notice of occurrence of an event in a distributed computing environment, the event characterized by a state of a prespecified network resource, the method comprising:

receiving a request from a client for notice of the occurrence of an event characterized by a state of a resource, said request comprising an identifier of a prespecified network resource;

identifying a monitor associated with an indicator of states of said resource; and registering the event from said client irrespective of whether the resource has changed location in the network.

2. The method of claim 1, wherein said identifier indicates that said resource is of a prespecified resource type.

3. The method of claim 2, wherein identifying said monitor comprises determining that monitors associated with indicators of states of resources of said type are identified by identifiers of resources of said type.

4. The method of claim 1, wherein identifying said monitor comprises determining said monitor from a database which correlates resources and monitors.

5. The method of claim 1, wherein receiving a request comprises receiving an identifier of said state.

6. The method of claim 1, further comprising obtaining indication of occurrence of said event.

7. The method of claim 6, wherein obtaining indication comprises determining a state of said resource which characterizes a default event.

8. The method of claim 6, wherein obtaining indication comprises receiving data from said indicator and determining whether said data indicates occurrence of said event.

9. The method of claim 8, wherein receiving data is preceded by initiating operation of said indicator.

10. The method of claim 6, wherein obtaining indication comprises periodically observing data provided by said indicator and determining whether said data indicates occurrence of said event.

11. The method of claim 10, wherein periodically observing data is preceded by initiating operation of said indicator.

12. The method of claim 6, wherein obtaining indication comprises:

requesting notice of occurrence of said event from said monitor; and receiving notice of occurrence of said event from said monitor.

13. The method of claim 12, wherein requesting comprises providing said identifier of said resource and an identifier of said state.

14. The method of claim 6, further comprising:

receiving identification of a requester of notice of occurrence of said event, and providing notice of occurrence of said event to said requester.

* * * * *